US007917912B2

(12) United States Patent
Gershinsky et al.

(10) Patent No.: US 7,917,912 B2
(45) Date of Patent: Mar. 29, 2011

(54) FILTERING APPLICATION MESSAGES IN A HIGH SPEED, LOW LATENCY DATA COMMUNICATIONS ENVIRONMENT

(75) Inventors: Gidon Gershinsky, Haifa (IL); Avraham Harpaz, Haifa (IL); Nir Naaman, Haifa (IL); Foluso O. Okunseinde, Austin, TX (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 11/728,850

(22) Filed: Mar. 27, 2007

(65) Prior Publication Data
US 2008/0244017 A1   Oct. 2, 2008

(51) Int. Cl.
G06F 13/00   (2006.01)
G06F 15/16   (2006.01)
(52) U.S. Cl. ........ 719/313; 719/318; 709/204; 709/205; 709/206; 709/207
(58) Field of Classification Search .................. 719/313, 719/318; 709/204–207
See application file for complete search history.

(56) References Cited

U.S. PATENT DOCUMENTS

| | | |
|---|---|---|
| 4,787,035 A | 11/1988 | Bourne |
| 4,947,429 A | 8/1990 | Bestler et al. |
| 5,195,092 A | 3/1993 | Wilson et al. |
| 5,732,274 A | 3/1998 | O'Neil |
| 5,809,028 A | 9/1998 | Nethercott et al. |
| 5,809,337 A | 9/1998 | Hannah et al. |
| 5,940,843 A | 8/1999 | Zucknovich et al. |
| 5,987,432 A | 11/1999 | Zusman et al. |
| 6,092,101 A | 7/2000 | Birrell et al. |
| 6,125,391 A | 9/2000 | Meltzer et al. |
| 6,141,324 A | 10/2000 | Abbott et al. |
| 6,160,874 A | 12/2000 | Dickerman et al. |

(Continued)

FOREIGN PATENT DOCUMENTS

EP   1 039 410 A   9/2000

(Continued)

OTHER PUBLICATIONS

"PCQuote.com Releases PCQuote Oribit", PR Newswire, New York: Nov. 2, 1999. p. 1.

(Continued)

*Primary Examiner* — Qing Wu
(74) *Attorney, Agent, or Firm* — Brandon C. Kennedy; Justin Dillon; Biggers & Ohanian, LLP

(57) ABSTRACT

Methods, systems, and products are disclosed for filtering application messages in a high speed, low latency data communications environment that include: receiving an application message in a transport engine of a message receiving device from a message transmitting device, the application message having a message contents label and a collision indicator, the message contents label representing contents of the application message, the collision indicator specifying whether the message contents label represents different contents in at least one other application message; determining, by the transport engine, whether contents of the application message satisfy a transport layer constraint in dependence upon the message contents label; providing, by the transport engine, the application message and the collision indicator to messaging middleware of the message receiving device if the contents of the application message satisfy the transport layer constraint; and administering the application message, by the messaging middleware, in dependence upon the collision indicator.

20 Claims, 6 Drawing Sheets

U.S. PATENT DOCUMENTS

| | | | |
|---|---|---|---|
| 6,694,316 B1 | 2/2004 | Langseth et al. | |
| 6,757,710 B2 | 6/2004 | Reed | |
| 6,901,428 B1 | 5/2005 | Frazier et al. | |
| 6,910,078 B1 | 6/2005 | Raman et al. | |
| 6,954,454 B1 | 10/2005 | Schuster et al. | |
| 7,092,992 B1 | 8/2006 | Yu | |
| 7,113,520 B1 | 9/2006 | Meenan | |
| 7,120,165 B2 * | 10/2006 | Kasvand-Harris et al. | 370/466 |
| 7,225,195 B2 | 5/2007 | Avrahami et al. | |
| 7,283,904 B2 * | 10/2007 | Benjamin et al. | 701/117 |
| 7,415,715 B2 | 8/2008 | Fradkov et al. | |
| 7,448,043 B2 | 11/2008 | Shenfield et al. | |
| 2001/0016783 A1 | 8/2001 | Graumann et al. | |
| 2002/0019812 A1 | 2/2002 | Board et al. | |
| 2002/0022952 A1 | 2/2002 | Zager et al. | |
| 2002/0023040 A1 | 2/2002 | Gilman et al. | |
| 2002/0083097 A1 | 6/2002 | Warrington | |
| 2002/0086688 A1 | 7/2002 | Kang | |
| 2002/0161900 A1 | 10/2002 | Brown et al. | |
| 2002/0169706 A1 | 11/2002 | Chandra et al. | |
| 2002/0172155 A1 | 11/2002 | Kasvand-Harris et al. | |
| 2003/0073406 A1 | 4/2003 | Benjamin et al. | |
| 2003/0115548 A1 | 6/2003 | Melgar | |
| 2003/0204719 A1 | 10/2003 | Ben-Itzhak | |
| 2004/0024753 A1 | 2/2004 | Chane et al. | |
| 2004/0024845 A1 | 2/2004 | Fishhaut et al. | |
| 2004/0034591 A1 | 2/2004 | Waelbroeck et al. | |
| 2004/0148357 A1 | 7/2004 | Corrigan et al. | |
| 2004/0190459 A1 | 9/2004 | Ueda et al. | |
| 2004/0193703 A1 | 9/2004 | Loewy et al. | |
| 2004/0199524 A1 | 10/2004 | Rys et al. | |
| 2004/0205439 A1 | 10/2004 | Carmeli et al. | |
| 2004/0216135 A1 * | 10/2004 | Heimbeck | 719/318 |
| 2005/0010311 A1 | 1/2005 | Barbazette et al. | |
| 2005/0028195 A1 | 2/2005 | Feinleib et al. | |
| 2005/0028208 A1 | 2/2005 | Ellis et al. | |
| 2005/0044197 A1 | 2/2005 | Lai | |
| 2005/0060643 A1 | 3/2005 | Glass et al. | |
| 2005/0105533 A1 | 5/2005 | Malolepsy et al. | |
| 2005/0149543 A1 | 7/2005 | Cohen et al. | |
| 2005/0195820 A1 | 9/2005 | Betts et al. | |
| 2005/0222931 A1 | 10/2005 | Mamou et al. | |
| 2005/0246186 A1 | 11/2005 | Nikolov | |
| 2005/0246423 A1 | 11/2005 | Starbuck et al. | |
| 2005/0254508 A1 | 11/2005 | Aksu et al. | |
| 2005/0261923 A1 | 11/2005 | Brown et al. | |
| 2005/0262025 A1 | 11/2005 | Wajih et al. | |
| 2005/0273408 A1 | 12/2005 | Bandman et al. | |
| 2006/0242240 A1 | 10/2006 | Parker et al. | |
| 2006/0269148 A1 | 11/2006 | Farber et al. | |
| 2007/0038543 A1 | 2/2007 | Weinstein | |
| 2007/0073907 A1 | 3/2007 | Factor et al. | |
| 2007/0091789 A1 | 4/2007 | Thukral | |
| 2007/0106813 A1 | 5/2007 | Bordes et al. | |
| 2007/0150918 A1 | 6/2007 | Carpenter et al. | |
| 2007/0233728 A1 | 10/2007 | Puteick et al. | |
| 2007/0271447 A1 | 11/2007 | Agarwala et al. | |
| 2007/0299936 A1 | 12/2007 | Borgendale et al. | |
| 2007/0299973 A1 | 12/2007 | Borgendale et al. | |
| 2007/0300233 A1 | 12/2007 | Bhogal et al. | |
| 2007/0300234 A1 | 12/2007 | Dekel et al. | |
| 2007/0300235 A1 | 12/2007 | Dekel et al. | |
| 2008/0010487 A1 | 1/2008 | Dekel et al. | |
| 2008/0069141 A1 | 3/2008 | Bonaguro et al. | |
| 2008/0103949 A1 | 5/2008 | Lobana et al. | |
| 2008/0104266 A1 | 5/2008 | Dekel et al. | |
| 2008/0114839 A1 | 5/2008 | Borgendale et al. | |
| 2008/0114938 A1 | 5/2008 | Borgendale | |
| 2008/0137830 A1 | 6/2008 | Bhogal et al. | |
| 2008/0140550 A1 | 6/2008 | Berezuk et al. | |
| 2008/0141272 A1 | 6/2008 | Borgendale et al. | |
| 2008/0141273 A1 | 6/2008 | Borgendale et al. | |
| 2008/0141275 A1 | 6/2008 | Borgendale et al. | |
| 2008/0141276 A1 | 6/2008 | Borgendale et al. | |
| 2008/0243675 A1 | 10/2008 | Parsons et al. | |
| 2008/0244017 A1 | 10/2008 | Gershinsky et al. | |
| 2009/0006559 A1 | 1/2009 | Bhogal et al. | |
| 2009/0006560 A1 | 1/2009 | Bhogal et al. | |
| 2009/0024498 A1 | 1/2009 | Berezuk et al. | |

FOREIGN PATENT DOCUMENTS

| | | |
|---|---|---|
| EP | 2007/055851 | 6/2007 |
| WO | WO9900753 A1 | 1/1999 |
| WO | WO 2005/045670 A | 5/2005 |

OTHER PUBLICATIONS

"FirstQuote Provides Financial Information Services for Brokat E-Finance Application", PR newswire, New York: Feb. 21, 2000.

Speakman, et al.; RFC 3208—PGM Reliable Transport Protocol Specification; 2001; p. 1-72; RFC 3208; Network Working Group.

PCT Search Report and Written Opinion, Jun. 5, 2008; PCT Application No. PCT/EP2007/063194.

PCT Search Report and Written Opinion, Feb. 4, 2008; PCT Application No. PCT/EP2007/063239.

PCT Search Report and Written Opinion, Jul. 7, 2008; PCT Application No. PCT/EP2008/053370.

PCT Search Report and Written Opinion, Sep. 14, 2007; PCT Application No. PCT/EP2007/055851.

Neville, Jennifer et al. "Using relational knowledge discovery to prevent securities fraud." Proceedings of the eleventh ACM SIGKDD international conference on Knowledge discovery in data mining. Aug. 2005. ACM Press. 449-458.

Office Action Dated Dec. 10, 2009 in U.S. Appl. No. 11/426,849.

Office Action Dated Aug. 18, 2009 in U.S. Appl. No. 11/609,566.

Office Action Dated Jan. 22, 2010 in U.S. Appl. No. 11/609,604.

Final Office Action Dated Aug. 14, 2009 in U.S. Appl. No. 11/567,898.

Office Action Dated Aug. 28, 2009 in U.S. Appl. No. 11/426,789.

Final Office Action Dated Dec. 2, 2009 in U.S. Appl. No. 11/426,864.

Final Office Action Dated Apr. 17, 2009 in U.S. Appl. No. 11/780,826.

Office Action Dated Oct. 30, 2008 in U.S. Appl. No. 11/780,826.

Office Action Dated Mar. 19, 2009 in U.S. Appl. No. 11/559,425.

Office Action Dated May 6, 2009 in U.S. Appl. No. 11/559,434.

Office Action Dated May 8, 2009 in U.S. Appl. No. 11/586,076.

Office Action Dated Mar. 6, 2009 in U.S. Appl. No. 11/426,764.

Office Action Dated Feb. 6, 2009 in U.S. Appl. No. 11/567,898.

Office Action Dated Apr. 6, 2009 in U.S. Appl. No. 11/608,904.

Office Action Dated Apr. 14, 2009 in U.S. Appl. No. 11/780,826.

Office Action Dated May 27, 2009 in U.S. Appl. No. 11/426,857.

Office Action Dated Jun. 1, 2009 in U.S. Appl. No. 11/769,240.

Office Action Dated Feb. 24, 2009 in U.S. Appl. No. 11/609,696.

Office Action Dated May 20, 2009 in U.S. Appl. No. 11/426,819.

Office Action Dated Jun. 2, 2009 in U.S. Appl. No. 11/426,864.

Office Action Dated Jun. 22, 2009 in U.S. Appl. No. 11/769,243.

Office Action Dated Jun. 25, 2009 in U.S. Appl. No. 11/426,849.

* cited by examiner

FILTERING APPLICATION MESSAGES IN A HIGH SPEED, LOW LATENCY DATA COMMUNICATIONS ENVIRONMENT

BACKGROUND OF THE INVENTION

1. Field of the Invention

The field of the invention is data processing, or, more specifically, methods, systems, and products for filtering application messages in a high speed, low latency data communications environment.

2. Description of Related Art

Messaging environments are generally available to provide data communication between message sending devices and message receiving devices using messages. A message is a quantity of data that includes one or more data fields and is passed from a message producer installed on a message sending device to a message consumer installed on a message receiving device. A message may represent, for example, numeric or textual information, images, encrypted information, and computer program instructions. An application message is a message whose contents are created, accessed, and utilized on behalf of application software operating in the application layers of a network protocol stack.

A messaging environment may support point-to-point messaging, publish and subscribe messaging, or both. In a point-to-point messaging environment, a message producer may address a message to a single message consumer. In a publish and subscribe messaging environment, a message producer may publish a message to a particular channel or topic and any message consumer that subscribes to that channel or topic receives the message. Because message producers and message consumers communicate indirectly with each other via a channel or topic in a publish and subscribe environment, message transmission is decoupled from message reception. As a consequence, neither producers nor consumers need to maintain state about each other, and dependencies between the interacting participants are reduced or eliminated. A publish and subscribe environment may, therefore, allow message publishers and message subscribers to operate asynchronously.

For further explanation of a messaging environment, FIG. 1 sets forth a block diagram illustrating a typical messaging environment for data communications that includes a message sending device (100), a message receiving device (104), and a message administration server (102). The message sending device (100) is a computer device having installed upon it a message producer (110), a set of computer program instructions configured for transmitting messages to the message administration server (102) for delivery to a message receiving device. In the example of FIG. 1, the message producer (110) transmits messages to the message administration server (102) on a message stream (106). The message sending device (100) may produce the transmitted messages by generating the messages from data of the message sending device itself or data received from some other source. The message receiving device (104) is a computer device having installed upon it a message consumer (112), a set of computer program instructions configured for receiving messages from the message administration server (102). In the example of FIG. 1, the message consumer (112) receives the messages from the message administration server (102) on a message stream (108). In the example of FIG. 1, the message stream (106) and the message stream (108) are data communication channels implemented using, for example, the User Datagram Protocol ('UDP') and the Internet Protocol ('IP').

In either a point-to-point messaging environment or a publish and subscribe messaging environment, the messages transmitted from message sending devices to message receiving devices typically pass through the message administration server (102). The message administration server (102) is computer device having installed upon it a message administration module (114), computer program instructions configured for administering the messages transmitted from the message producer (110) to the message consumer (112). Examples of message administration modules may include the IBM WebSphere® MQ, the Open Message Queue from Sun Microsystems, and the OpenJMS from The OpenJMS Group. In a point-to-point messaging environment, the message administration module (114) provides message queuing for the message consumer (112) as the message administration module (114) receives messages addressed to the consumer (112) from various message providers. In a publish and subscribe messaging environment, the message administration module (114) administers the various channels or topics to which message producers publish and message consumers subscribe. In either message environment, the message administration module (114) may also provide security services to ensure that the only messages arriving at the messaging consumer (112) from the message producer (110) are those messages that the message consumer (112) is authorized to receive and that the message producer (110) is authorized to send.

Current messaging environments such as, for example, the one described above with reference to FIG. 1, have certain drawbacks. Messages transmitted to a message administration server from a message sending device for delivery to a message receiving device are delayed in the message administration server until the message administration server can process the messages. The message processing that occurs in the message administration server typically increases the overall messaging latency of the messaging environment and decreases the overall speed for transmitting data in the data communications environment. Messaging latency is the time period beginning when the message producer transmits a message and ending when the message consumer receives the message.

In many data communication environments, even slight increases in messaging latency are costly. Consider, for example, a financial market data environment. A financial market data environment is a data processing environment used to communicate information about financial markets and participants in financial markets. In a financial market data environment, a message is commonly referred to as a 'tick' and represents financial market data such as, for example, financial quotes or financial news. Financial quotes include bid and ask prices for any given financial security. A 'bid' refers to the highest price offered by a buyer to a seller for a security. An 'ask' refers to the lowest price a seller is willing to accept for a security. In a financial market data environment, a message producer may provide quotes for the purchase or sale of financial securities based on real-time financial market conditions, and a message consumer may buy and sell financial securities based on financial quotes. When a message consumer buys or sells a financial security based on the quoted price provided by the message producer, the ability of a message consumer to obtain the bid or ask in the quote for the financial security is largely influenced by messaging latency in the financial market data environment. The higher the messaging latency, the less likely a buy or sell order generated by the message consumer will execute at or near the price stated in the financial quote. In fact, a highly volatile security may fluctuate in price dramatically over a time period of a few seconds.

Current solutions to reduce messaging latency are to remove the message administration server from the messaging environment. In such current solutions, the message sending devices send messages directly to message receiving devices. The drawback to such current solutions is that removing the message administration server removes the administration functionality provided by the message administration server from the messaging environment. Current solutions, therefore, effectively offer no solution in messaging environments where the administrative functions of a message administration server are required. Consider again the financial market data environment example from above. In such an exemplary financial market data environment, consider that a message receiving device is only authorized to receive financial quotes on certain financial securities or only authorized to receive financial quotes that are at least fifteen minutes old. Removing the message administration server from such a financial market data environment inhibits the ability to filter the messages received by the message receiving device from the message sending device in the financial market data environment. As such, readers will recognize that room for improvement exists in filtering application messages in a high speed, low latency data communications environment.

In some systems, the administrative functions of a message administration server may not be required. In such systems, system designers may still filter the application messages in the message receiving device. Current solutions to filtering in such systems typically implement filtering in the application software layer that processes the application messages. The contents of each message are often examined to determine whether the message is authorized for further processing. In high speed, low latency data communications environments, however, examining the contents of each message received is often an ineffective solution because messages typically arrive faster than they can be filtered. As such, readers will recognize that room for improvement exists in filtering application messages in a high speed, low latency data communications environment.

SUMMARY OF THE INVENTION

Methods, systems, and products are disclosed for filtering application messages in a high speed, low latency data communications environment that include: receiving an application message in a transport engine of a message receiving device from a message transmitting device, the application message having a message contents label and a collision indicator, the message contents label representing contents of the application message, the collision indicator specifying whether the message contents label represents different contents in at least one other application message; determining, by the transport engine, whether contents of the application message satisfy a transport layer constraint in dependence upon the message contents label; providing, by the transport engine, the application message and the collision indicator to messaging middleware of the message receiving device if the contents of the application message satisfy the transport layer constraint; and administering the application message, by the messaging middleware, in dependence upon the collision indicator.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
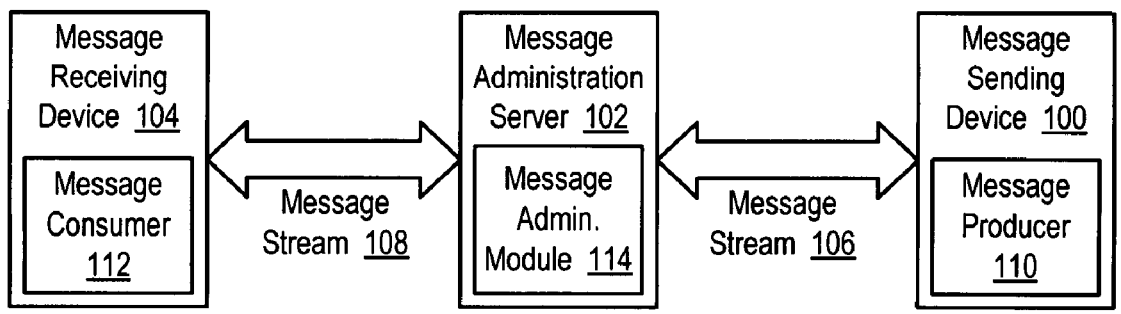
FIG. 1 sets forth a block diagram illustrating a typical messaging environment for data communications.
Figure 2:
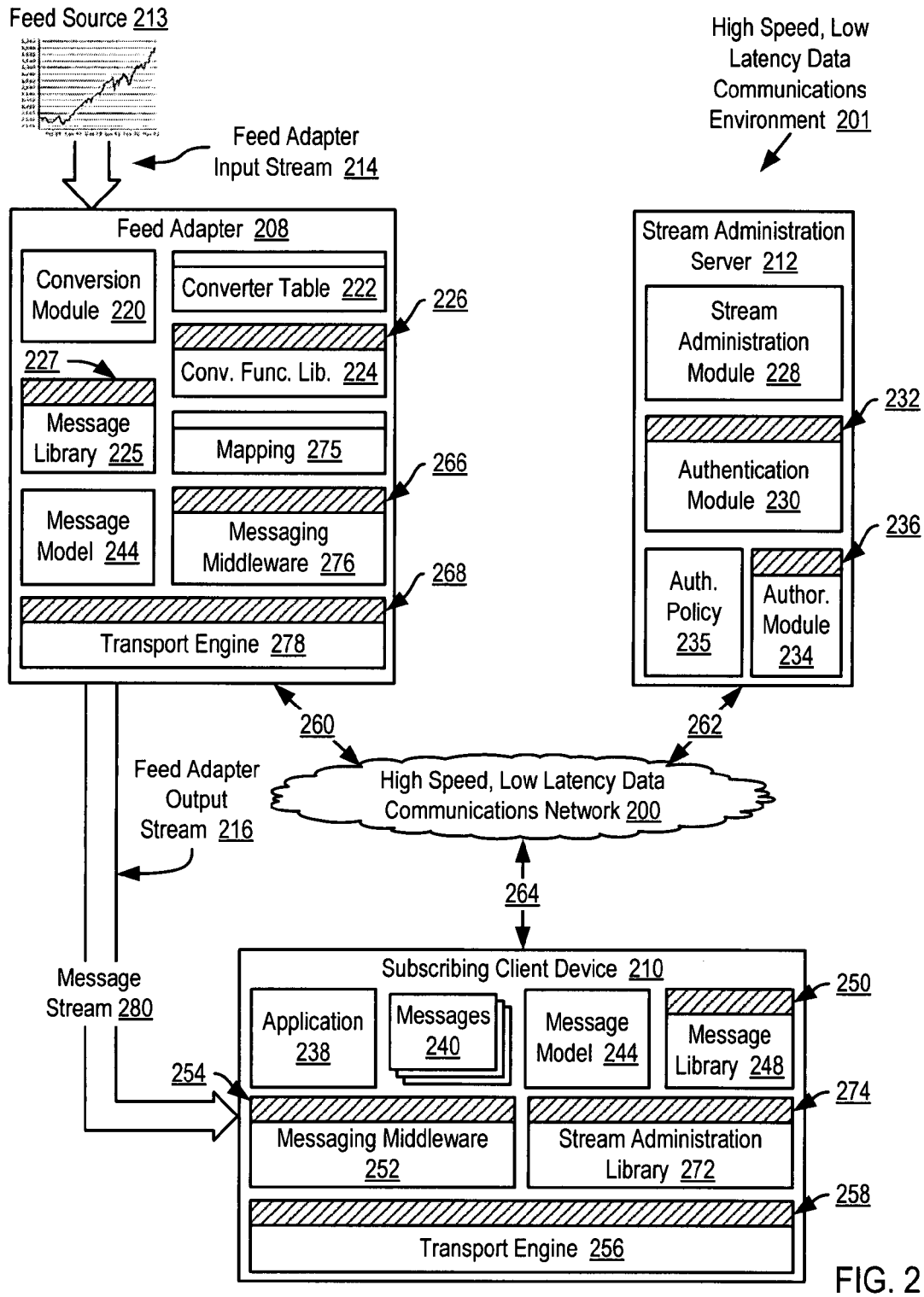
FIG. 2 sets forth a network and block diagram illustrating an exemplary computer data processing system for filtering application messages in a high speed, low latency data communications environment according to exemplary embodiments of the present invention.

Exemplary methods, systems, and products for filtering application messages in a high speed, low latency data communications environment according to embodiments of the present invention are described with reference to the accompanying drawings, beginning with FIG. 2. FIG. 2 sets forth a network and block diagram illustrating an exemplary computer data processing system for filtering application messages in a high speed, low latency data communications environment according to embodiments of the present invention. The system of FIG. 2 operates generally for filtering application messages in a high speed, low latency data communications environment according to embodiments of the present invention as follows: A transport engine (256) of a message receiving device (210) receives an application message from a message transmitting device (208). The message receiving device (210) of FIG. 2 is implemented as a subscribing client device, and the message transmitting device (208) of FIG. 2 is implemented as a feed adapter. The application message has a message contents label and a collision indicator. The message contents label represents contents of the application message, and the collision indicator specifies whether the message contents label represents different contents in at least one other application message. The transport engine (256) determines whether contents of the application message satisfy a transport layer constraint in dependence upon the message contents label. The transport layer constraint is a constraint on application messages to be received by the message receiving device (210) from the message transmitting device (208). The transport layer constraint is applied to the application messages by a software component operating in the transport layer of the network protocol stack as opposed to being applied by a software component operating in the application layer. The transport engine (256) provides the application message and the collision indicator to messaging middleware (252) of the message receiving device (210) if the contents of the application message satisfy the transport layer constraint. The messaging middleware (252) of the message receiving device (210) administers the application message (426) in dependence upon the collision indicator. In the example of FIG. 2, a stream administration server (212) brokers establishment of a message stream (280) from the message transmitting device (208) to the message receiving device (210), including authenticating the message receiving device (210), authorizing the message receiving device (210) to receive application messages from the message transmitting device (208) on the message stream (280), and providing to the transport engine (256) of the message receiving device (210) the transport layer constraint.

The system of FIG. 2 may also operates for filtering application messages in a high speed, low latency data communications environment according to embodiments of the present invention as follows: Messaging middleware (276) of the message transmitting device (208) receives the application message for transmission to the message receiving device (210) from a conversion application of the message transmitting device (208). The messaging middleware (276) of the message transmitting device (208) retrieves the contents of the application message and calculates the message contents label in dependence upon the retrieved contents of the application message. The messaging middleware (276) of the message transmitting device (208) sets the collision indicator for the application message in dependence upon the message content label and a mapping (275) between contents of application messages and message contents labels. A transport engine (278) of the message transmitting device (208) transmits the application message, the message contents label, and the collision indicator to the message receiving device (210).

The high speed, low latency data communications environment (201) illustrated in FIG. 2 includes a high speed, low latency data communications network (200). The network (200) includes a feed adapter (208), a stream administration server (212), and a subscribing client device (210), as well as the infrastructure for connecting such devices (208, 212, 210) together for data communications. The network (200) of FIG. 2 is termed 'high speed, low latency' because the application messages sent between devices connected to the network (200) on message streams administered by the stream administration server (212) bypass the stream administration server (212). For example, the application messages on the message stream (280) from the feed adapter (208) to the subscribing client device (210) bypass the stream administration server (212). Although such messages are not delayed for processing in the stream administration server (212), the stream administration server (212) retains administration of the stream (280) between devices connected to the high speed, low latency data communications network (200).

Further contributing to the 'high speed, low latency' nature of network (200), readers will note that the network (200) does not include a router, that is a computer networking device whose primary function is to forward data packets across a network toward their destinations. Rather, each device (208, 212, 210) provides its own routing functionality for data communication through a direct connection with the other devices connected to the network (200). Because the network (200) does not include a computer networking device dedicated to routing data packets, the network (200) of FIG. 2 may be referred to as a 'minimally routed network.' Although the exemplary network (200) illustrated in FIG. 2 does not include a router, such a minimally routed network is for explanation only. In fact, some high speed, low latency networks useful in filtering application messages in a high speed, low latency data communications environment according to embodiments of the present invention may include a router.

The high speed, low latency data communications environment (201) depicted in FIG. 2 includes a message stream (280). A message stream is a data communication channel between a communications endpoint of a sending device and a communications endpoint of at least one receiving device. A communications endpoint is composed of a network address and a port for a transmitting device or a receiving device. A message stream may be implemented as a multicast data communication channel. In a multicast data communication channel, a one-to-many relationship exists between a destination address for a message and the communication endpoints of receiving devices. That is, each destination address identifies a set of communication endpoints for receiving devices to which each message of the stream is replicated. A multicast data communication channel may be implemented using, for example, the User Datagram Protocol ('UDP') and the Internet Protocol ('IP'). In addition to a multicast data communication channel, the message stream may be implemented as a unicast data communication channel. In a unicast data communication channel, a one-to-one relationship exists between a destination address for a message and a communication endpoint of a receiving device. That is, each destination address uniquely identifies a single communication endpoint of single receiving device. A unicast data communication channel may be implemented using, for example, the Transmission Control Protocol ('TCP') and IP.

The exemplary system of FIG. 2 includes a stream administration server (212) connected to the high speed, low latency data communications network (200) through a wireline connection (262). The stream administration server (212) of FIG. 2 is a computer device having installed upon it a stream administration module (228), an authentication module (230), an authorization module (234), and an authorization policy (235). A stream administration module (228) is a software component that includes a set of computer program instructions configured for filtering application messages in a high speed, low latency data communications environment according to embodiments of the present invention. The stream administration module (228) operates generally for filtering application messages in a high speed, low latency data communications environment according to embodiments of the present invention by brokering establishment of a message stream (280) from the message transmitting device (208) to the message receiving device (210), including authenticating the message receiving device (210), authorizing the message receiving device (210) to receive application messages from the message transmitting device (208) on the message stream (280), and providing to the transport engine (256) of the message receiving device (210) the transport layer constraint.

The authentication module (230) of FIG. 2 is a set of computer program instructions capable of providing authentication security services to the stream administration module (228) through an exposed authentication application programming interface ('API') (232). Authentication is a process of verifying the identity of an entity. In the exemplary system of FIG. 2, the authentication module (230) verifies the identity of the subscribing client device (210). The authentication module (230) may provide authentication security services using a variety of security infrastructures such as, for example, shared-secret key infrastructure or a public key infrastructure.

The authorization module (234) of FIG. 2 is a set of computer program instructions capable of providing authorization security services to the stream administration module (228) through an exposed authorization API (236). Authorization is a process of only allowing resources to be used by resource consumers that have been granted authority to use the resources. In the example of FIG. 2, the authorization module (234) identifies the application messages that the subscribing client device (210) is authorized to receive on the message stream (280). The authorization module (234) of FIG. 2 provides authorization security services using an authorization policy (235). The authorization policy (235) is a set of rules governing the privileges of authenticated entities to send or receive application messages on a message stream. In a financial market data environment, for example, an authenticated entity may be authorized to receive application messages that include financial quotes for some financial securities but not other securities. The authorization policy (235) may grant privileges on the basis of an individual entity or an entity's membership in a group. In the exemplary system of FIG. 2, feed adapter (208) is connected to the high speed, low latency data communications network (200) through a wireline connection (260). The feed adapter (208) is a computer device having the capabilities of converting application messages received on a feed adapter input stream (214) having a first format to application messages having a second format for transmission on a feed adapter output stream (216) to subscribing client devices. The feed adapter input stream (214) is a message stream from a feed source to the feed adapter (208). The feed adapter output stream (216) is a message stream administered by the stream administration server (212) from the feed adapter (208) to the subscribing client device (210).

In the example of FIG. 2, the feed adapter (208) receives application messages on the feed adapter input stream (214) from a feed source (213). The feed source (213) is a computer device capable of aggregating data into application messages and transmitting the messages to a feed adapter. In a financial market data environment, for example, a feed source (213) may be implemented as a feed source controlled by the Options Price Reporting Authority ('OPRA'). OPRA is the securities information processor for financial market information generated by the trading of securities options in the United States. The core information that OPRA disseminates is last sale reports and quotations. Other examples of feed sources in financial market data environment may include feed sources controlled by the Consolidated Tape Association ('CTA') or The Nasdaq Stock Market, Inc. The CTA oversees the dissemination of real-time trade and quote information in New York Stock Exchange and American Stock Exchange listed securities. The Nasdaq Stock Market, Inc. operates the NASDAQ Market Center$^{SM}$ which is an electronic screen-based equity securities market in the United States. In a financial market data environment, a feed adapter input stream is referred to as a 'financial market data feed.'

The feed adapter (208) of FIG. 2 has installed upon it a conversion module (220), a converter table (222), conversion function library (224), a message library (225), a message model (244), a mapping (275), messaging middleware (276), and a transport engine (278). The conversion module (220) is a set of computer program instructions for converting application messages received on the feed adapter input stream (214) having a first format into application messages (240) having a second format for transmission to subscribing devices on the feed adapter output stream (216).

The conversion module (220) converts application messages from the first format to the second format according to the converter table (222). The converter table (222) of FIG. 2 is a data structure that specifies the converter functions capable of converting the application message from one format to another format. Utilizing multiple converter tables, the conversion module (220) may convert messages from a variety of input formats to a variety of output formats. In the example of FIG. 2, the converter table (222) specifies the converter functions capable of converting the application message received from the feed adapter input stream (214) having the first format to application messages (240) having the second format for transmission to subscribing client devices on the feed adapter output stream (216). The converter table (222) of FIG. 2 may be implemented using a structured document such as, for example, an eXtensible Markup Language ('XML') document.

The conversion function library (224) of FIG. 2 is a loadable software module that contains one or more converter functions capable of converting data fields in an application message from one format to another format or converting values of data fields from one value to another value. The converter functions contained in the conversion function library may, for example, convert a 16-bit integer to a 32-bit integer, convert a number stored in a string field to a 64-bit double floating point value, increase the value of one data field by one, or any other conversion as will occur to those of skill in the art. The conversion module (220) accesses the converter functions through a set of converter function APIs (226) exposed by the converter functions of the conversion function library (224). In the example of FIG. 2, the conversion function library (224) may be implemented as dynamically linked libraries available to the conversion module (220) at runtime, statically linked libraries linked into the conversion module (220) at compile time, dynamically loaded Java classes, or any other implementation as will occur to those of skill in the art.

In the example of FIG. 2, the application messages (240) transmitted by the feed adapter (208) have a format specified in a message model (244). The message model (244) is metadata that defines the structure and the format used to create, access, and manipulate the application messages (240) converted from the application messages (not shown) received from the feed source (213). That is, the message model (244) specifies a message format for interpreting application messages and includes one or more field specifications. Each field specification specifies a message field for storing data in an application message and includes field characteristics of the message field. In the example of FIG. 2, the message model (244) is established on both the feed adapter (208) and the subscribing client device (210) by the stream administration server (212) when the stream administration server (212) brokers a message stream to a subscribing client device. A message model may be implemented using a structured document, such as, for example, an XML document, a Java object, C++ object, or any other implementation as will occur to those of skill in the art.

In the example of FIG. 2, the conversion module (220) and the converter functions of the conversion function library (224) process the data contained in the application messages (240) using the message library (225). The message library (225) is a software module that includes a set of functions for creating, accessing, and manipulating messages (240) according to a message model (244). The message library (225) is accessible to the conversion module (220), the converter functions of the conversion function library (224), and the messaging middleware (276) through a message API (227) exposed by the message library (225).

Before the conversion module (220) of FIG. 2 performs data processing on the application messages, the conversion module (220) receives application messages (not shown) having a first format from the feed source (213). The conversion module (220) of FIG. 2 may receive the source stream messages through a receiving transport engine (not shown) of the feed adapter (208). The receiving transport engine is a software module that operates in the transport layer of the network stack and may be implemented according to the TCP/IP protocols, UDP/IP protocols, or any other data communication protocol as will occur to those of skill in the art. The receiving transport engine may provide the received application messages directly to the conversion module (220) or to the messaging middleware (276), which in turn, provides the source stream messages to the conversion module (220).

After the conversion module (220) of FIG. 2 performs data processing on the application messages received from the feed source (213), the conversion module (220) provides the application messages having the second format to the messaging middleware (276). The messaging middleware (276) of FIG. 2 is a software component that provides high availability services between the feed adapter (208), any backup feed adapter that may exist, the subscribing client device (210), and the feed source (213). In addition, the messaging middleware (276) of FIG. 2 includes a set of computer program instructions capable of filtering application messages in a high speed, low latency data communications environment according to embodiments of the present invention. The messaging middleware (276) operates generally for filtering application messages in a high speed, low latency data communications environment according to embodiments of the present invention by receiving the application message for transmission to the message receiving device (210) from a conversion application (220) of the message transmitting device (208), retrieving the contents of the application message, calculating the message contents label for the application in dependence upon the retrieved contents of the application message, and setting the collision indicator for the application message in dependence upon the message content label and the mapping (275) between contents of application messages and message contents labels. The message contents label is a value representing the contents of the application message. The messaging middleware (276) then provides the received application messages, the calculated message contents labels, and the collision indicators to the transport engine (278) for transmission to a subscribing client device (210) on the feed adapter output stream (216). The conversion module (220) interacts with the messaging middleware (276) through a messaging middleware API (266) exposed by the messaging middleware (276).

As mentioned above, a collision indictor for an application message specifies whether the message contents label for the message represents different contents in at least one other application message. In this manner, the collision indictor indicates when a label collision exists for the application manner. A label collision exists when a single message contents label represents more than one set of message contents. A label collision typically occurs due to the nature in which the message content label is calculated. A message contents label is typically implemented as a hash value, checksum, or some other value derived from the contents of the application message. Often with algorithms, such as a hashing algorithm, used to generate a message contents label, there exists the possibility that two different inputs to the algorithm produce the same output. When different inputs to an algorithm generating the message content label produce the same value for the message content label, then a label collision is said to occur.

The transport engine (278) of FIG. 2 is a software component operating in the transport and network layers of the OSI protocol stack promulgated by the International Organization for Standardization. The transport engine (278) provides data communications services between network-connected devices. The transport engine may be implemented according to the UDP/IP protocols, TCP/IP protocols, or any other data communications protocols as will occur to those of skill in the art. The transport engine (278) is a software module that includes a set of computer program instructions for filtering application messages in a high speed, low latency data communications environment according to embodiments of the present invention. The transport engine (278) operates generally for filtering application messages in a high speed, low latency data communications environment according to embodiments of the present invention by transmitting the application message, the message contents label, and the collision indicator to the message receiving device (210). The messaging middleware (276) operates the transport engine (278) through a transport API (268) exposed by the transport engine (278). The transport engine (278) of FIG. 2 may transmit the transmitting the application message, the message contents label, and the collision indicator by receiving the application message, the message contents label, and the collision indicator from the messaging middleware (276), prepending the message contents label and the collision indicator to the application message, encapsulating the application message, the message contents label, and the collision indicator provided by the messaging middleware (276) into transport packets, and transmitting the packets through the message stream (280) to the subscribing client device (210).

The subscribing client device (210) in exemplary system of FIG. 2 connects to the high speed, low latency data communications network (200) through a wireline connection (264). The subscribing client device (210) of FIG. 2 is a computer device capable of subscribing to the message streams transmitted by various feed adapters. In a financial market data environment, for example, a subscribing client device may subscribe to a tick to receive the bid and ask prices for a particular security on a message stream provided by a feed adapter controlled by a financial securities broker.

In the example of FIG. 2, the subscribing client device (210) has installed upon it an application (238), a message library (248), a message model (244), messaging middleware (252), a stream administration library (272), and a transport engine (256). The application (238) is a software component that processes data contained in the application messages (240) received from the feed adapter (208). The application (238) may process the data for utilization by the subscribing client device (210) itself, for contributing the data to another feed adapter, or for contributing the data to some other device. In a financial market data environment, the application installed on the subscribing client device may be a program trading application that buys or sells financial securities based on the quoted prices contained in ticks. The application may also be a value-adding application that contributes information to a tick such as, for example, the best bid and ask prices for a particular security, that is not typically included in the ticks provided by the feed source (213). The subscribing client device may then transmit the ticks to a feed adapter for resale to other subscribing client devices.

The application (238) processes the data contained in the application messages (240) using the message library (248). The message library (248) is software module that includes a set of functions for creating, accessing, and manipulating messages (240) according to the message model (244) that is installed on both the feed adapter (208) and the subscribing client device (210). The message library (248) is accessible to the application (238) through a message API (250) exposed by the message library (248).

The communications between the subscribing client device (210) and the stream administration server (212) may be implemented using a stream administration library (272). The stream administration library (272) is a set of functions contained in dynamically linked libraries or statically linked libraries available to the application (238) through a stream administration library API (274). Through the stream administration library (272), the subscribing client device (210) of FIG. 2 may request to subscribe to messages from a feed adapter, modify an existing message subscription, or cancel a subscription. Functions of the stream administration library (272) used by the application (238) may communicate with the stream administration server (212) through network (200) by calling member methods of a CORBA object, calling member methods of remote objects using the Java Remote Method Invocation ('RMI') API, using web services, or any other communication implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java™ Remote Method Invocation API is a Java application programming interface for performing remote procedural calls published by Sun Microsystems™. The Java™ RMI API is an object-oriented way of making remote procedure calls between Java objects existing in separate Java™ Virtual Machines that typically run on separate computers. The Java™ RMI API uses a remote procedure object interface to describe remote objects that reside on the server. Remote procedure object interfaces are published in an RMI registry where Java clients can obtain a reference to the remote interface of a remote Java object. Using compiled 'stubs' for the client side and 'skeletons' on the server side to provide the network connection operations, the Java™ RMI allows a Java client to access a remote Java object just like any other local Java object.

Before the application (238) processes the data contained in the application messages (240), the application (238) receives the messages (240) from the messaging middleware (252), which, in turn, receives the application messages (240) from the feed adapter (208) through the transport engine (256). The messaging middleware (252) is a software component that provides high availability services between the subscribing client device (210), the feed adapter (208), any backup feed adapters, and the stream administration module (212). In addition, the messaging middleware (252) includes a set of computer program instructions for filtering application messages in a high speed, low latency data communications environment according to embodiments of the present invention. The messaging middleware (252) of FIG. 2 operates generally for filtering application messages in a high speed, low latency data communications environment according to embodiments of the present invention by administering the application message in dependence upon the collision indicator for the application message. The messaging middleware (252) of FIG. 2 may also establish a middleware layer constraint on application messages to be provided to the application (238) of the subscribing client device (210), calculate the transport layer constraint in dependence upon the middleware layer constraint, and provide the transport layer constraint to the transport engine (256) of the subscribing client device (210). The application (238) and the stream administration library (272) interact with the messaging middleware (252) through a messaging middleware API (254).

The transport engine (256) of FIG. 2 is a software component operating in the transport and network layers of the OSI protocol stack promulgated by the International Organization for Standardization. The transport engine (256) provides data communications services between network-connected devices. The transport engine may be implemented according to the UDP/IP protocols, TCP/IP protocols, or any other data communications protocols as will occur to those of skill in the art. The transport engine (256) is a software component that includes a set of computer program instructions configured for filtering application messages in a high speed, low latency data communications environment according to embodiments of the present invention. The transport engine (256) operates generally for filtering application messages in a high speed, low latency data communications environment according to embodiments of the present invention by: receiving an application message in a transport engine of a message receiving device from a message transmitting device, the application message having a message contents label and a collision indicator, the message contents label representing contents of the application message, the collision indicator specifying whether the message contents label represents different contents in at least one other application message; determining, by the transport engine of the message receiving device, whether contents of the application message satisfy a transport layer constraint in dependence upon the message contents label; and providing, by the transport engine of the message receiving device, the application message and the collision indicator to messaging middleware of the message receiving device if the contents of the application message satisfy the transport layer constraint.

As mentioned above, the transport engine (256) of FIG. 2 receives application messages (240), message content labels, and collision indicators from the feed adapter (208). The transport engine (256) receives the application messages, message content labels, and collision indicators by receiving transport packets through the message stream (280) from the feed adapter (208), and unencapsulating the application messages, message content labels, and collision indicators from the received packets. In accordance with embodiments of the present invention, the transport engine (256) of FIG. 2 then provides the application messages (240) and the collision indicators to messaging middleware (252) of the subscribing client device (210) if the contents of each application message (240) satisfy the transport layer constraint. In the example of FIG. 2, the messaging middleware (252) operates the transport engine (256) through a transport API (258) exposed by the transport engine (256).

After the transport engine (256) provides the application messages (240) and the collision indicators to messaging middleware (252), readers will recall that the messaging middleware (252) of FIG. 2 operates for filtering application messages in a high speed, low latency data communications environment according to embodiments of the present invention by administering the application messages (240) in dependence upon the collision indicators. Using the collision indicator for an application message, the messaging middleware (252) may determine whether a label collision for the application message exists and either provide the application message to an application of the message receiving device if a label collision for the application message does not exists or administer the application message in dependence upon the determination of whether the contents of the application message satisfy a middleware layer constraint. Because the filtering performed by the messaging middleware does not utilize the message contents label—rather, it uses the actual contents of the application message—message middleware filtering is immune to label collisions. Filtering in the messaging middleware layer in the exemplary system of FIG. 2 advantageously provides the ability to filter out application message for which a subscribing client device is not authorized to receive when those messages penetrated through the transport layer due to a label collision. Using the collision indicator, however, the exemplary system of FIG. 2 advantageously avoids the overhead of filtering application message in the messaging middleware layer when a label collision does not exist.

The servers and other devices illustrated in the exemplary system of FIG. 2 are for explanation, not for limitation. Devices useful in filtering application messages in a high speed, low latency data communications environment may be implemented using general-purpose computers, such as, for example, computer servers or workstations, hand-held computer devices, such as, for example, Personal Digital Assistants ('PDAs') or mobile phones, or any other automated computing machinery configured for data processing according to embodiments of the present invention as will occur to those of skill in the art.

The arrangement of servers and other devices making up the exemplary system illustrated in FIG. 2 are for explanation, not for limitation. Although the connections to the network (200) of FIG. 2 are depicted and described in terms of wireline connections, readers will note that wireless connections may also be useful according to various embodiments of the present invention. Furthermore, data processing systems useful according to various embodiments of the present invention may include additional servers, routers, other devices, and peer-to-peer architectures, not shown in FIG. 2, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 2.

Filtering application messages in a high speed, low latency data communications environment in accordance with the present invention in some embodiments may be implemented with one or more message receiving devices, stream administration servers, and message transmitting devices. These devices and servers are, in turn, implemented to some extent at least as computers, that is, automated computing machinery. For further explanation, therefore, FIG. 3 sets forth a block diagram of automated computing machinery comprising an exemplary message receiving device (300) useful in filtering application messages in a high speed, low latency data communications environment according to embodiments of the present invention. The message receiving device (300) of FIG. 3 includes at least one computer processor (156) or 'CPU' as well as random access memory (168) ('RAM') which is connected through a high speed memory bus (166) and bus adapter (158) to processor (156) and to other components of the message receiving device.

Figure 3:
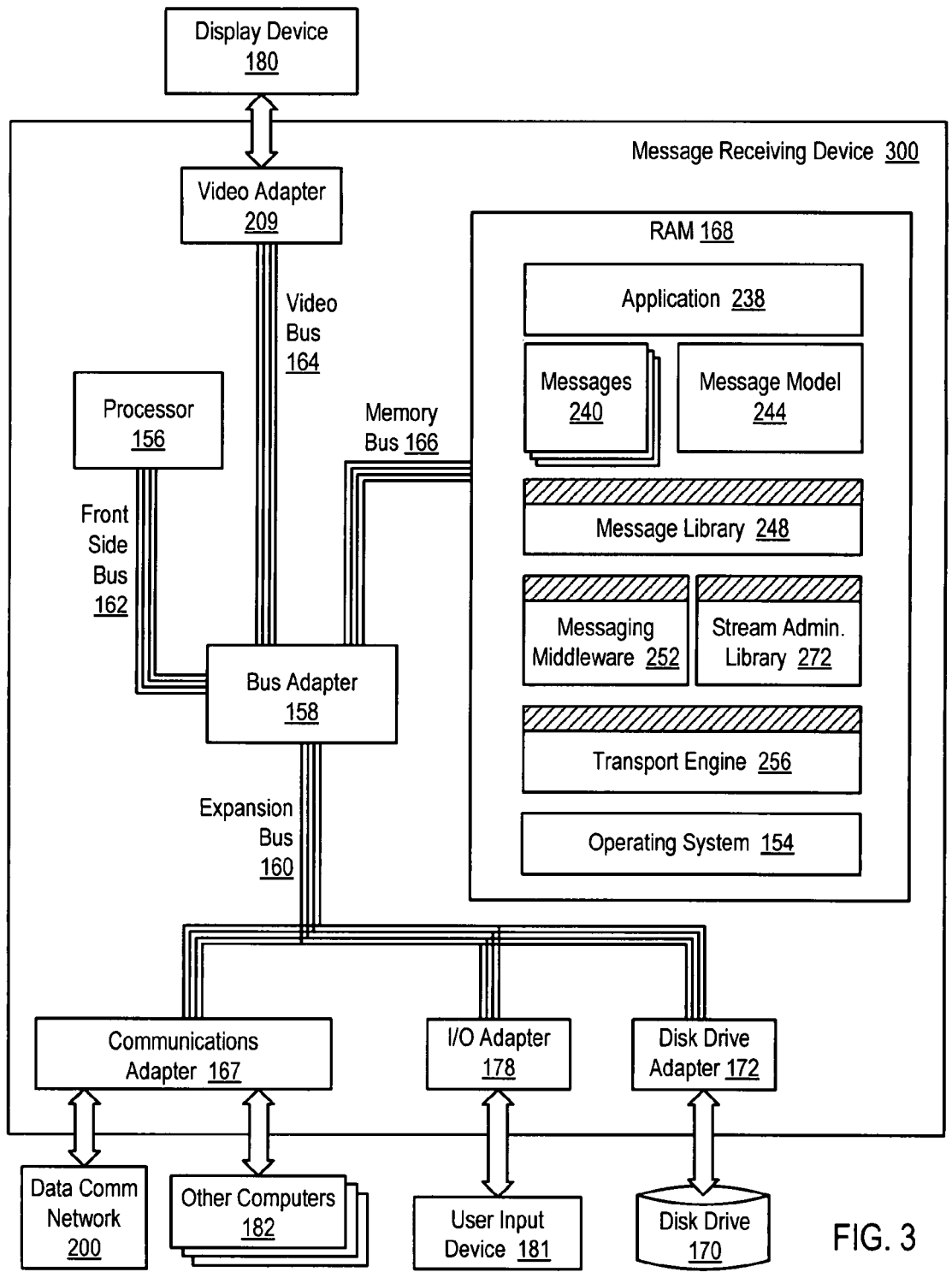
FIG. 3 sets forth a block diagram of automated computing machinery comprising an exemplary message receiving device useful in filtering application messages in a high speed, low latency data communications environment according to exemplary embodiments of the present invention.

Stored in RAM (168) of FIG. 3 are an application (238), messages (240), message model (244), a message library (248), a messaging middleware (252) a stream administration library (272), and a transport engine (256). Each message (240) is a quantity of data that includes one or more data fields and is transmitted from one device to another on a message stream. As mentioned above, a message may represent numeric or textual information, images, encrypted information, computer program instructions, and so on. In a financial market data environment, for example, a message is commonly referred to as a 'tick' and represents financial market data such as, for example, financial quotes or financial news. Each message (240) may be implemented using a structured document such as, for example, an XML document, a Java object, C++ object, or any other implementation as will occur to those of skill in the art. The message model (244) is metadata that defines the structure and format of the messages (240). The message model (244) may also be implemented using a structured document such as, for example, an XML document, a Java object, C++ object, or any other implementation as will occur to those of skill in the art. The application (238), the message library (248), the messaging middleware (252), the stream administration library (272), and the transport engine (256) illustrated in FIG. 3 are software components, that is computer program instructions, that operate as described above with reference to the message receiving device (210) in FIG. 2.

Also stored in RAM (168) is an operating system (154). Operating systems useful in message receiving devices according to embodiments of the present invention include UNIX™, Linux™, Microsoft NT™, IBM's AIX™, IBM's iS/OS™, and others as will occur to those of skill in the art. The operating system (154), the application (238), the messages (240), the message model (244), the message library (248), the messaging middleware (252), and the transport engine (256) in the example of FIG. 3 are shown in RAM (168), but many components of such software typically are stored in non-volatile memory also, for example, on a disk drive (170).

The exemplary message receiving device (300) of FIG. 3 includes bus adapter (158), a computer hardware component that contains drive electronics for high speed buses, the front side bus (162), the video bus (164), and the memory bus (166), as well as drive electronics for the slower expansion bus (160). Examples of bus adapters useful in message receiving devices useful according to embodiments of the present invention include the Intel Northbridge, the Intel Memory Controller Hub, the Intel Southbridge, and the Intel I/O Controller Hub. Examples of expansion buses useful in message receiving devices useful according to embodiments of the present invention may include Peripheral Component Interconnect ('PCI') buses and PCI Express ('PCIe') buses.

The exemplary message receiving device (300) of FIG. 3 also includes disk drive adapter (172) coupled through expansion bus (160) and bus adapter (158) to processor (156) and other components of the exemplary message receiving device (300). Disk drive adapter (172) connects non-volatile data storage to the exemplary message receiving device (300) in the form of disk drive (170). Disk drive adapters useful in message receiving devices include Integrated Drive Electronics ('IDE') adapters, Small Computer System Interface ('SCSI') adapters, and others as will occur to those of skill in the art. In addition, non-volatile computer memory may be implemented for a message receiving device as an optical disk drive, electrically erasable programmable read-only memory (so-called 'EEPROM' or 'Flash' memory), RAM drives, and so on, as will occur to those of skill in the art.

The exemplary message receiving device (300) of FIG. 3 includes one or more input/output ('I/O') adapters (178). I/O adapters in message receiving devices implement user-oriented input/output through, for example, software drivers and computer hardware for controlling output to display devices such as computer display screens, as well as user input from user input devices (181) such as keyboards and mice. The exemplary message receiving device (300) of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary message receiving device (300) of FIG. 3 includes a communications adapter (167) for data communications with other computers (182) and for data communications with a high speed, low latency data communications network (200). Such data communications may be carried out through Ethernet™ connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for filtering application messages in a high speed, low latency data communications environment according to embodiments of the present invention include modems for wired dial-up communications, IEEE 802.3 Ethernet adapters for wired data communications network communications, and IEEE 802.11b adapters for wireless data communications network communications.

Although FIG. 3 is discussed with reference to exemplary message receiving devices, readers will note that automated computing machinery used to implement exemplary stream administration servers and exemplary message transmitting devices useful in filtering application messages in a high speed, low latency data communications environment according to embodiments of the present invention are similar to the exemplary message receiving device (300) of FIG. 3. That is, such exemplary stream administration servers and feed adapters include one or more processors, bus adapters, buses, RAM, video adapters, communications adapters, I/O adapters, disk drive adapters, and other components similar to the exemplary message receiving device (300) of FIG. 3 as will occur to those of skill in the art.

Figure 4:
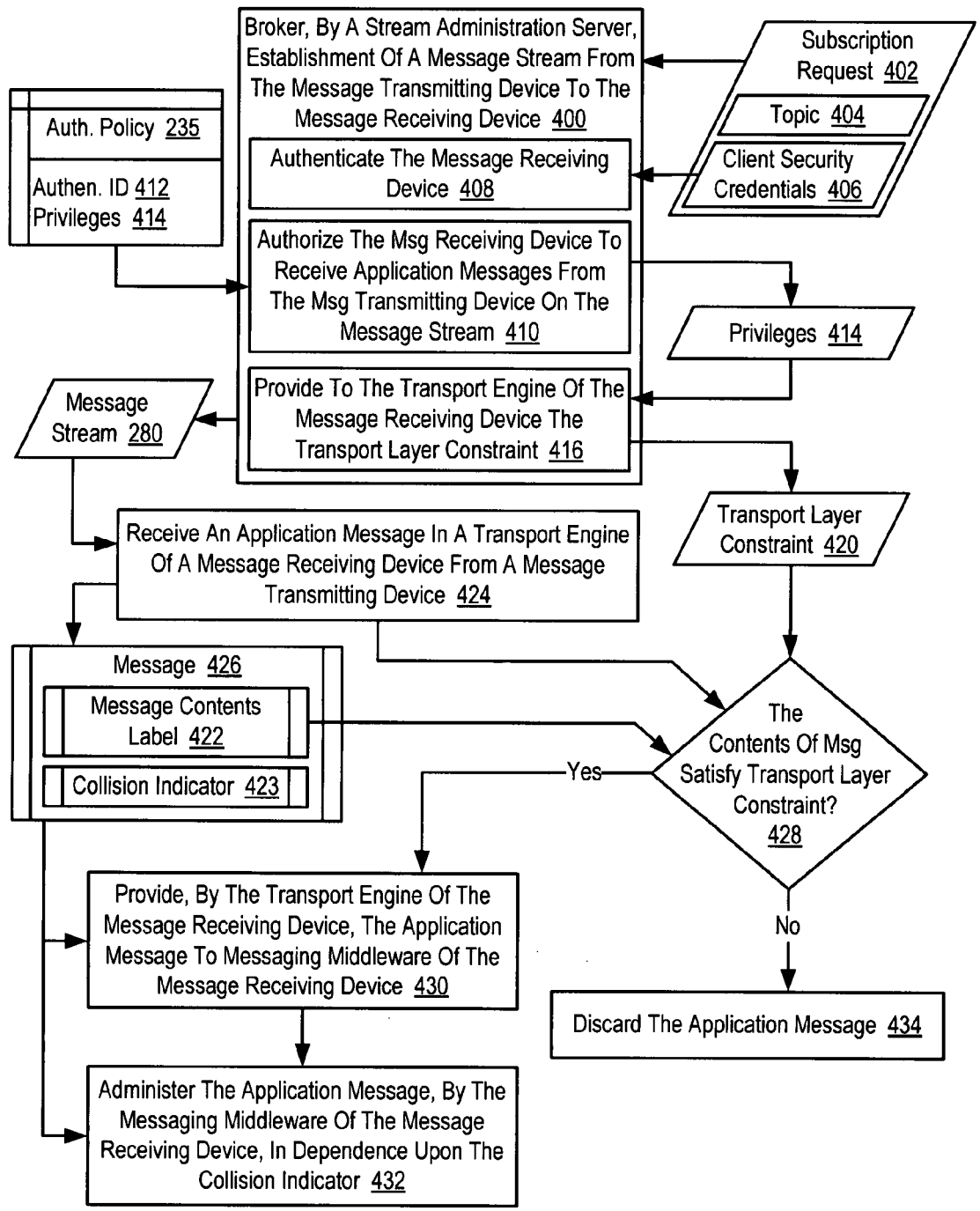
FIG. 4 sets forth a flowchart illustrating an exemplary method of filtering application messages in a high speed, low latency data communications environment in a high speed, low latency data communications environment according to exemplary embodiments of the present invention.

For further explanation, FIG. 4 sets forth a flowchart illustrating an exemplary method of filtering application messages in a high speed, low latency data communications environment in a high speed, low latency data communications environment according to embodiments of the present invention. The method of FIG. 4 includes brokering (400), by a stream administration server, establishment of a message stream (280) from the message transmitting device to the message receiving device. The message stream (280) represents a data communication channel between a communications endpoint of a message receiving device and a communications endpoint of a message transmitting device. A message stream may be implemented as a multicast data communication channel using the UDP/IP protocols or a unicast data communication channel using TCP/IP protocols as discussed above with reference to FIG. 2.

Brokering (400), by a stream administration server, establishment of a message stream (280) from the message transmitting device to the message receiving device according to the method of FIG. 4 may be carried out by receiving a subscription request (402) from a message receiving device to subscribe to application messages from a message transmitting device. The subscription request (402) is a request by an application of a message receiving device to receive data from a message transmitting device. The subscription request (402) of FIG. 4 may be implemented as an XML document, a call to a member method of a RMI object on the message receiving device, or any other implementation as will occur to those of skill in the art.

The subscription request (402) of FIG. 4 includes the topic (404) of the application messages that the message receiving device requests to receive from the message transmitting device. A topic represents the characteristics of the messages that the message receiving device requests to receive. Each application message typically includes a topic data field describing the information contained in the application message. Using a topic, a message receiving device may specify the group of messages that the message receiving device requests to receives from a message transmitting device. In a financial market data environment, for example, a message receiving device may use a topic to request to receive ticks from an OPRA feed source that contains quotes of an IBM option traded on the Chicago Board Options Exchange ('CBOE') that includes the best bid and best ask for the IBM option on the CBOE.

Brokering (400), by a stream administration server, establishment of a message stream (280) from the message transmitting device to the message receiving device according to the method of FIG. 4 may also be carried out by providing the message receiving device a destination address for the message transmitting device. The destination address for the message transmitting device is a multicast address or a unicast address used by the message receiving device to listen for messages from the message transmitting device. Using the destination address provided by the stream administration server, the message receiving device may establish the message stream (280) from the message transmitting device to the message receiving device.

Before the stream administration server provides the destination address for the message transmitting device, the stream administration server in the example of FIG. 4 performs several security services to ensure that the message receiving device only receives messages from the message transmitting device for which the message receiving device is authorized to receive. In the method of FIG. 4, brokering (400), by a stream administration server, establishment of a message stream (280) from the message transmitting device to the message receiving device includes authenticating (408) the message receiving device. Authenticating (408) the message receiving device according to the method of FIG. 4 may be carried out by verifying client security credentials (406) provided by the message receiving device with the subscription request (402). The client security credentials (406) may be implemented as a digital signature in a public key infrastructure, a security token, or any other security data as will occur to those of skill in the art for authenticating the identity of the originator of the subscription request (402). Examples of security token may include those security tokens described in the web services specification entitled 'Web Services Security' ('WS-Security') developed by IBM, Microsoft, and VeriSign or the web services specification entitled 'Web Services Trust Language' ('WS-Trust') developed by IBM, Microsoft, VeriSign, OpenNetworks, Layer 7, Computer Associates, BEA, Oblix, Reactivity, RSA Security, Ping Identity, and Actional.

In the method of FIG. 4, brokering (400), by a stream administration server, establishment of a message stream (280) from the message transmitting device to the message receiving device also includes authorizing (410) the message receiving device to receive application messages from the message transmitting device on the message stream (280). Authorizing (410) the message receiving device to receive application messages from the message transmitting device on the message stream (280) according to the method of FIG. 4 may be carried out by identifying the privileges (414) associated with the authenticated message receiving device in dependence upon an authorization policy (235). The authorization policy (235) is a set of rules governing the privileges of authenticated message receiving devices requesting to receive data from a message transmitting device. In the example of FIG. 4, the authorization policy (235) associates privileges (414) with an authenticated message receiving device identifier (412). The authenticated message receiving device identifier (412) represents a message receiving device authenticated by a stream administration server. The privileges (414) represent the set of application messages permissible for an authenticated message receiving device identified by the associated authenticated message receiving device identifier (414) to receive from a message transmitting device. Different authenticated message receiving devices may have difference privileges. Although the authorization policy (235) depicted in FIG. 4 associates individual authenticated users with certain privileges, such a depiction is for explanation and not for limitation. The authorization policy (235) may, in fact, grant privileges on the basis of a message receiving device's membership in a group or on any other basis as will occur to those of skill in the art.

Brokering (400), by a stream administration server, establishment of a message stream (280) from the message transmitting device to the message receiving device according to the method of FIG. 4 also includes providing (416) to the transport engine of the message receiving device the transport layer constraint (420). The transport layer constraint (420) represents a constraint on application messages to be received by the message receiving device from a message transmitting device. The transport layer constraint specifies the characteristics of the application messages which a message receiving device is authorized to receive from a message transmitting device. The transport layer constraint is so-called because it is applied to the application messages by a software component operating in the transport layer of the network protocol stack as opposed to being applied by a software component operating in the application layer. In a financial market data environment, for example, transport layer constraints may specify that a particular authenticated message receiving device is authorized to receive ticks from an OPRA feed source that contains quotes of an IBM option traded on the Chicago Board Options Exchange ('CBOE') that include the best bid and best ask for the IBM option on the CBOE.

In the method of FIG. 4, providing (416) to the transport engine of the message receiving device the transport layer constraint (420) may be carried out by returning the transport layer constraint (420) to a message receiving device in response to a function call by a stream administration library that provided the subscription request (402). Providing (416) to the transport engine of the message receiving device the transport layer constraint (420) according to the method of FIG. 4 may also be carried out by returning data to the message receiving device from which the message receiving device may derive the transport layer constraint (420). For example, the message receiving device may be provided the topic of the application messages that the message receiving device is authorized to receive, and the message receiving device may then derive the transport layer constraint (420) as a hash value of the received topic. The stream administration server may provide the transport layer constraint (420) to the transport engine in the message receiving device directly from the stream administration server or indirectly from the stream administration server through messaging middleware of the message receiving device. The transport layer constraint (420) may be stored in a constraints table (not shown) in the transport engine. Such a constraints table may be used by the transport engine as a convenient data structure for storing multiple transport layer constraints.

The method of FIG. 4 includes receiving (424) an application message (426) in a transport engine of a message receiving device from a message transmitting device. The application message (426) represents a quantity of data that includes one or more data fields such as, for example, numeric or textual information, images, encrypted information, computer program instructions, and so on. The application message (416) is capable of being passed from a message transmitting device to a message receiving device. As mentioned above, in a financial market data environment, a message is commonly referred to as a 'tick' and represents financial market data such as, for example, financial quotes or financial news. Receiving (424) an application message (426) in a transport engine of a message receiving device from a message transmitting device according to the method of FIG. 4 may be carried out by receiving transport packets through the message stream (280) from the message transmitting device (208) and unencapsulating the application messages from the received transport packets.

In the example of FIG. 4, the application message (426) has a message contents label (422) and a collision indicator (423). The message contents label (422) represents contents of the application message (426). The message contents label (422) of FIG. 4 may be implemented as a hash value of a particular field in the application message (426) calculated using a hashing algorithm. In a financial market data environment, the particular field in an application message, or 'tick,' used to calculate the message contents label may be the topic field. The collision indicator (423) of FIG. 4 specifies whether the message contents label (422) represents different contents in at least one other application message. If the message contents label (422) in fact represents different contents in at least one other application message, then a label collision exists. A label collision may occur because the message contents label is typically implemented as a hash value, checksum, or some other value derived from the contents of the application message. Often with algorithms, such as a hashing algorithm, used to generate a message contents label, there exists the possibility that label collisions will occur over the range of inputs for the algorithm. A label collision occurs when two different inputs to the algorithm produce the same message contents label. In a financial market data environment, for example, a collision indictor for an application message may represent whether the message contents label for the application message unambiguously corresponds to a single value for the topic field or whether the message contents label corresponds to more than one value for the topic field.

The method of FIG. 4 includes determining (428), by the transport engine of the message receiving device, whether contents of the application message (426) satisfy a transport layer constraint (420) in dependence upon the message contents label (422). As mentioned above, the transport layer constraint (420) represents a constraint on application messages to be received by the message receiving device from a message transmitting device. The transport layer constraint (420) of FIG. 4 may be implemented as a hash value calculated from one or more data fields in the application message (426). In a financial market data environment, for example, the transport layer constraint (420) may be implemented a hash value calculated from the topic field.

Determining (428), by the transport engine of the message receiving device, whether contents of the application message (426) satisfy a transport layer constraint (420) in dependence upon the message contents label (422) according to the method of FIG. 4 may be carried out by comparing the message contents label (422) to the transport layer constraint (420). If the message contents label (422) matches the transport layer constraint (420), then the contents of the application message (426) satisfy the transport layer constraint (420). The contents of the application message (426) do not satisfy the transport layer constraint (420), however, if the message contents label (422) matches the transport layer constraint (420).

The method of FIG. 4 includes discarding (434) the application message (426) if the contents of the application message (426) do not satisfy the transport layer constraint (420). If the contents of the application message (426) do not satisfy the transport layer constraint (420), then the message receiving device is not authorized to receive the application message in the application layer of the device.

The method of FIG. 4 includes providing (430), by the transport engine of the message receiving device, the application message (426) and the collision indicator (423) to messaging middleware of the message receiving device if the contents of the application message (426) satisfy the transport layer constraint (420). Providing (430), by the transport engine of the message receiving device, the application message (426) and the collision indicator (423) to messaging middleware of the message receiving device according to the method of FIG. 4 may be carried out by passing a pointer to the data structures storing the application message (426) and the collision indicator (423) to the messaging middleware through an API that implements data communication between the messaging middleware and the transport engine.

The method of FIG. 4 also includes administering (432) the application message (426), by the messaging middleware of the message receiving device, in dependence upon the collision indicator (423). Administering (432) the application message (426), by the messaging middleware of the message receiving device, in dependence upon the collision indicator (423) according to the method of FIG. 4 may be carried out by determining whether a label collision for the application message (426) exists in dependence upon the collision indicator (423) and providing the application message (426) to an application of the message receiving device without filtering the application message (426) in the messaging middleware if a label collision for the application message (426) does not exists as discussed below with reference to FIG. 5. Administering (432) the application message (426), by the messaging middleware of the message receiving device, in dependence upon the collision indicator (423) according to the method of FIG. 4 may be carried out by determining whether a label collision for the application message (426) exists in dependence upon the collision indicator (423), determining whether the contents of the application message (426) satisfy a middleware layer constraint if a label collision for the application message (426) exists, and administering the application message (426) in dependence upon the determination whether the contents of the application message (426) satisfy the middleware layer constraint as discussed below with reference to FIG. 5.

Figure 5:
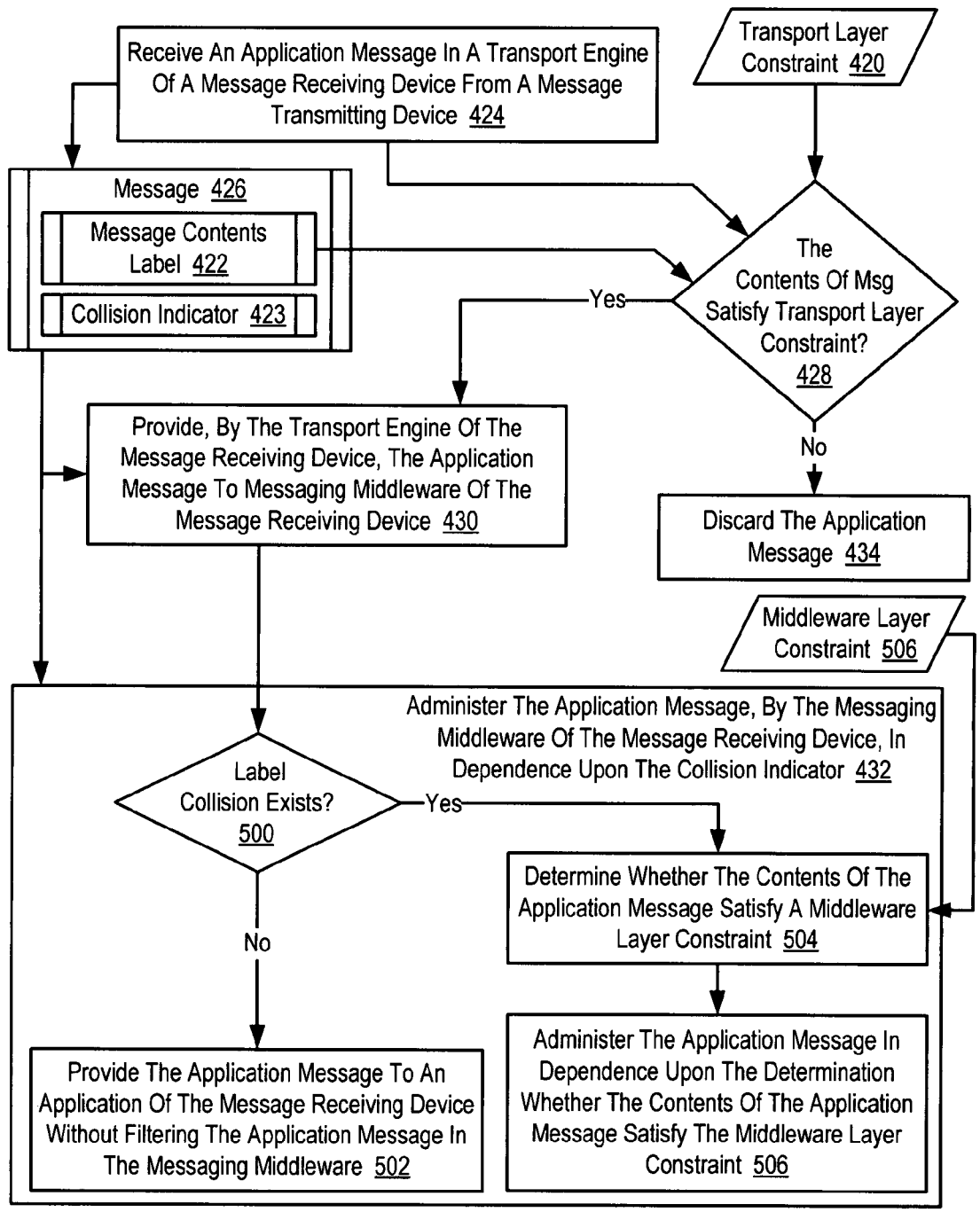
FIG. 5 sets forth a flowchart illustrating a further exemplary method of filtering application messages in a high speed, low latency data communications environment in a high speed, low latency data communications environment according to exemplary embodiments of the present invention.

For further explanation, FIG. 5 sets forth a flowchart illustrating a further exemplary method of filtering application messages in a high speed, low latency data communications environment in a high speed, low latency data communications environment according to embodiments of the present invention. The method of FIG. 5 is similar to the method of FIG. 4. That is, the method of FIG. 5 includes receiving (424) an application message (426) in a transport engine of a message receiving device from a message transmitting device, determining (428), by the transport engine of the message receiving device, whether contents of the application message satisfy a transport layer constraint in dependence upon the message contents label (422), providing (430), by the transport engine of the message receiving device, the application message (426) and the collision indicator to messaging middleware of the message receiving device if the contents of the application message (426) satisfy the transport layer constraint (420), and administering (432) the application message (426), by the messaging middleware of the message receiving device, in dependence upon the collision indicator (423).

The method of FIG. 5 is also similar to the method of FIG. 4 in that the method of FIG. 5 includes discarding (434) the application message (426) if the contents of the application message (426) do not satisfy the transport layer constraint (420). In the example of FIG. 5, the application message (426) has a message contents label (422) and a collision indicator (423). The message contents label (422) represents contents of the application message. The collision indicator (423) specifies whether the message contents label (422) represents different contents in at least one other application message.

Administering (432) the application message (426), by the messaging middleware of the message receiving device, in dependence upon the collision indicator (423) according to the method of FIG. 5 includes determining (500) whether a label collision for the application message exists in dependence upon the collision indicator (423). As mentioned above, a label collision exists when a single message contents label represents different contents from one application message to another. A label collision may occur because the message contents label is typically implemented as a hash value, checksum, or some other value derived from the contents of the application message. Often with algorithms, such as a hashing algorithm, used to generate a message contents label, there exists the possibility that label collisions will occur over the range of inputs for the algorithm. A label collision occurs when two different inputs to the algorithm produce the same message contents label. That is, a label collision occurs when the message contents label (422) represents different contents from one application message to another.

In the method of FIG. 5, determining (500) whether a label collision for the application message (426) exists in dependence upon the collision indicator (423) may be carried out by reading the value for the collision indicator (423) for the application message (426). In the example of FIG. 5, the collision indicator (423) for the application message (426)

may be implemented as a Boolean flag that specify whether the message contents label (422) for the message (426) represents different contents in at least one other application message. A value of TRUE may indicate that the message contents label (422) for the message (426) represents different contents in at least one other application message. That is, a value of TRUE may indicate that a label collision exists. A value of FALSE may indicate that the message contents label (422) for the message (426) does not represent different contents in at least one other application message. That is, a value of FALSE may indicate that a label collision does not exist. The collision indicator (423) may be set by the message transmitting device that calculates the message contents label (422) for the application message (426) as discussed in more detail below with reference to FIG. 6.

The method of FIG. 5 includes providing (502) the application message (426) to an application of the message receiving device without filtering the application message in the messaging middleware if a label collision for the application message (426) does not exist. Providing (502) the application message (426) to an application of the message receiving device without filtering the application message in the messaging middleware if a label collision for the application message (426) does not exist according to the method of FIG. 5 may be carried out by passing the application message (426) or a pointer to the application message (426) to the application of the message receiving device through an API implementing data communications between the application and the messaging middleware. Providing (502) the application message (426) to an application of the message receiving device is performed without filtering the application message in the messaging middleware according to the method of FIG. 5 in that the contents of the application message (426) are not tested in the messaging middleware layer to determine whether contents of the application message (426) satisfy a messaging middleware layer constraint. The method of FIG. 5 also includes determining (504) whether the contents of the application message satisfy a middleware layer constraint (506) if a label collision for the application message (426) does in fact exist. The middleware layer constraint (506) represents a constraint on application messages to be provided to application software installed on the message receiving device. The middleware layer constraint specifies the characteristics of the application messages which application software installed on the message receiving device is authorized to receive from the messaging middleware of the subscribing client device. In a financial market data environment, the middleware layer constraint (506) may be implemented as a value for the topic field in a financial market data tick. The middleware layer constraint is applied to the application messages by a software component, such as messaging middleware, operating between the transport layer and the application layer of the network protocol stack as opposed to being applied by a software component operating in the application layer.

Determining (504) whether the contents of the application message satisfy a middleware layer constraint (506) if a label collision for the application message (426) does in fact exist according to the method of FIG. 5 may be carried out by comparing the contents of the application message (426) to the middleware layer constraint (506). If the contents of the application message (426) match the middleware layer constraint (506), then the contents of the application message (426) satisfy a middleware layer constraint (506). The contents of the application message (426) do not satisfy a middleware layer constraint (506), however, if the contents of the application message (426) do not match the middleware layer constraint (506). For example, in a financial market data environment, the messaging middleware may determine whether the contents of the application message satisfy a middleware layer constraint (506) by comparing the value for the topic field in the application message with the value for the topic field specified in the middleware layer constraint (506) as an authorized message topic for the application of the message receiving device to receive from a message transmitting device. Determining (504) whether the contents of the application message satisfy a middleware layer constraint (506) if a label collision for the application message (426) as described above advantageously provides the ability to filter out application messages for which a message receiving device is not authorized to receive when those messages penetrated through the transport layer due to a label collision. Readers will note, however, that the messaging middleware only determines whether the contents of the application message satisfy a middleware layer constraint (506) when the collision indicator specifies that a label collision exists. Using the collision indicator, the exemplary method of FIG. 5 advantageously avoids the overhead of filtering application message in the messaging middleware layer when a label collision does not exist.

The method of FIG. 5 includes administering (506) the application message (426) in dependence upon the determination whether the contents of the application message (426) satisfy the middleware layer constraint (506). Administering (506) the application message (426) in dependence upon the determination whether the contents of the application message (426) satisfy the middleware layer constraint (506) according to the method of FIG. 5 may be carried out by providing the application message (426) to an application of the message receiving device if the contents of the application message (426) satisfy the middleware layer constraint (506). Administering (506) the application message (426) in dependence upon the determination whether the contents of the application message (426) satisfy the middleware layer constraint (506) according to the method of FIG. 5 may be carried out by discarding the application message (426) if the contents of the application message (426) do not satisfy the middleware layer constraint (506).

As mentioned above, the collision indicator for an application message may be set by the message transmitting device that calculates the message contents label for the application message. Typically, the collision indicator and the message contents label may then be transmitted along with the application message to the message receiving device. For further explanation, therefore, FIG. 6 sets forth a flowchart illustrating a further exemplary method of filtering application messages in a high speed, low latency data communications environment in a high speed, low latency data communications environment according to embodiments of the present invention that includes setting (608), by the messaging middleware of the message transmitting device, the collision indicator (423) for the application message (426).

Figure 6:
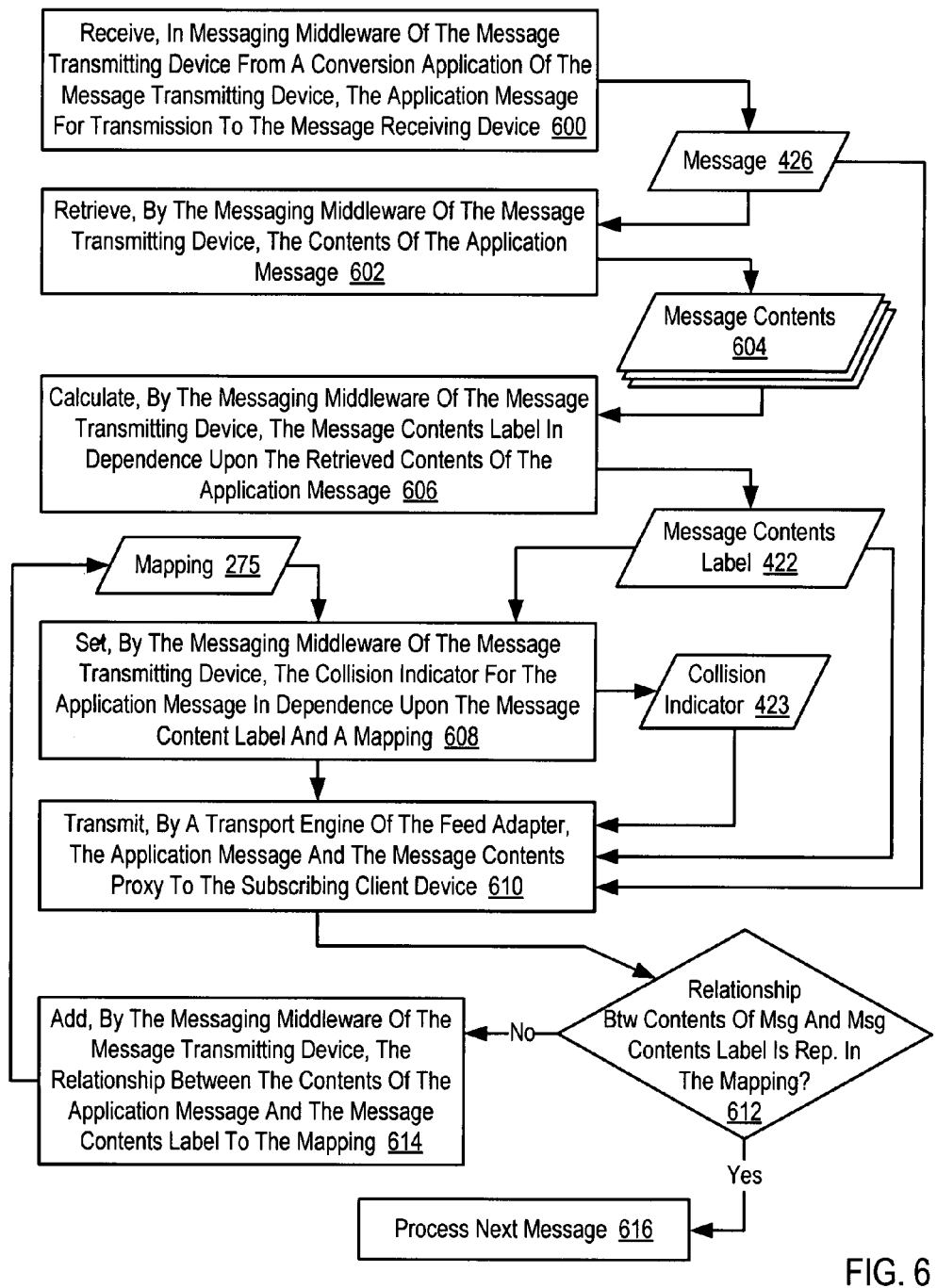
FIG. 6 sets forth a flowchart illustrating a further exemplary method of filtering application messages in a high speed, low latency data communications environment in a high speed, low latency data communications environment according to exemplary embodiments of the present invention.

Prior to setting (608) the collision indicator (423) for the application message (426), however, the method of FIG. 6 includes receiving (600), in messaging middleware of the message transmitting device from a conversion application of the message transmitting device, the application message (426) for transmission to the message receiving device. The conversion application is a software component installed on the message transmitting device that converts application messages having a first format received on a message transmitting device input stream from a feed source to application messages having a second format for transmission to a message receiving device on a message transmitting device output stream. In the method of FIG. 6, the messaging middleware of the message transmitting device may receive (600) the application message (426) from the conversion application by receiving a copy of the application message (426) or a pointer to the application message (426) when the conversion application invokes a function of the messaging middleware API.

The method of FIG. 6 also includes retrieving (602), by the messaging middleware of the message transmitting device, the contents (604) of the application message (426). The message contents (604) represent values from one or more of the message fields in the application message (426). Messaging middleware of the message transmitting device may retrieve (602) the contents (604) of the application message (426) by reading values directly from one or more message fields of the application message (426) using a message model that describes the location of the message fields in the message (426). Rather than reading a value directly from a message field of the application message (426), messaging middleware may also retrieve (602) the contents (604) of the application message (426) by passing the application message (426) and a message field name to a function of a messaging library on the message transmitting device and receiving, in return, the value from the message field of the application message (426) identified by the message field name.

As mentioned above, the method of FIG. 6 includes calculating (606), by the messaging middleware of the message transmitting device, a message contents label (422) in dependence upon the retrieved contents (604) of the application message (426). The messaging middleware of the message transmitting device may calculate (606) a message contents label (422) according to the method of FIG. 6 by concatenating the message contents (604) together and executing a hash algorithm over the concatenated message contents. The result calculated using the hash algorithm may be implemented as the message contents label (422). In the example of FIG. 6, the fields of the application message (426) retrieved by the message transmitting device and used to calculate the message contents label (422) correspond to the message fields specified by the transport layer constraint or any middleware layer constraint used to filter the application message. In a financial market data environment, the contents (604) may be implemented as the value from the topic field of the application message.

The method of FIG. 6 also includes setting (608), by the messaging middleware of the message transmitting device, the collision indicator (423) for the application message (426) in dependence upon the message content label (422) and a mapping (275) between contents of application messages and message contents labels. As mentioned above, the message contents label (422) represents contents of the application message (426), and the collision indicator (423) specifies whether the message contents label (422) represents different contents in at least one other application message. The mapping (275) is a data structure that represents the relationships between contents of application messages and message contents labels. That is, the mapping (275) associates a particular message contents label with the corresponding message contents used to calculate the particular message contents label. Although most message contents labels will have a one-to-one relationship with the message contents used to calculate the message content labels, when a label collision exists for a particular message contents label, the message contents label will have a relationship with more than one message contents because more than one message contents result in the same message content label. That is, this one-to-many relationship results because two different message contents may result in the same message contents label when the message contents label is calculated using a hashing algorithm, checksum algorithm, or some other algorithm for deriving value based on the contents of an application message. The collision indicator (423) for the application message (426) may be implemented as a Boolean flag such that a value of TRUE indicates that a label collision exists for the message contents label (422) for the application message (426) and a value of FALSE indicates that a label collision does not exist for the message contents label (422) for the application message (426).

In the method of FIG. 6, setting (608), by the messaging middleware of the message transmitting device, the collision indicator (423) for the application message (426) in dependence upon the message content label (422) and a mapping (275) between contents of application messages and message contents labels may be carried out by scanning the mapping (275) to determine whether the message contents label (422) is contained in the mapping (275) and setting the collision indicator (423) to FALSE if the message contents label (422) is not contained in the mapping (275). If the message contents label (422) is not contained in the mapping (275), then the message contents label (422) only has a relationship with one message contents—the message contents (604) used to calculated the message contents label (422). Setting (608) the collision indicator (423) for the application message (426) may also be carried out according to the method of FIG. 6 by scanning the mapping (275) to determine whether the message contents label (422) is contained in the mapping (275) and setting the collision indicator (423) to FALSE if the message contents label (422) is contained in the mapping (275) and only has a relationship with contents that match the contents (604) retrieved from the application message (426). If the message contents label (422) is contained in the mapping (275) and has a relationship with contents that do not match the contents (604) retrieved from the application message (426), setting (608) the collision indicator (423) for the application message (426) may also be carried out according to the method of FIG. 6 by setting the collision indicator (423) to TRUE to indicate that the message contents label (422) represents different contents in at least one other application message.

The method of FIG. 6 also includes transmitting (610), by a transport engine of the message transmitting device, the application message (426), the message contents label (422), and the collision indicator (423) to the message receiving device. The transport engine of the message transmitting device may transmit (610) the application message (426), the message contents label (422), and the collision indicator (423) to the message receiving device according to method of FIG. 6 by prepending the message contents label (422) and the collision indicator (423) to the application message (436), encapsulating the message contents label (422), the collision indicator (423), and the application message (436) into one or more transport packets, and transmitting the transport packets to a transport engine in the message receiving device. Transmitting (610) the message contents label (422), and the collision indicator (423) to the message receiving device advantageously allows the message receiving device to filter application messages in the transport layer based on the contents of the application message without having to examine the actual contents of the application messages in the transport layer. By removing the need to examine the actual contents of the application messages and providing the filtering functionality in the transport layer of the message receiving device based on a message contents label and a transport layer constraint, filtering application messages may be effectively carried out in a high speed, low latency data communications environment.

The method of FIG. 6 also includes determining (612), by the messaging middleware of the message transmitting device, whether a relationship between the contents of the application message (426) and the message contents label (422) is represented in the mapping (275) between contents of application messages and message contents labels. Determining (612), by the messaging middleware of the message transmitting device, whether a relationship between the contents of the application message (426) and the message contents label (422) is represented in the mapping (275) according to the method of FIG. 6 may be carried out by scanning the mapping (275) to identify whether the message contents label (422) is associated in the mapping (275) with the contents (604) retrieved from the application message (426). If the message contents label (422) is associated in the mapping (275) with the contents (604) retrieved from the application message (426), then the relationship between the contents of the application message (426) and the message contents label (422) is represented in the mapping (275) between contents of application messages and message contents labels. If the message contents label (422) is not associated in the mapping (275) with the contents (604) retrieved from the application message (426), then the relationship between the contents of the application message (426) and the message contents label (422) is not represented in the mapping (275) between contents of application messages and message contents labels.

The method of FIG. 6 also includes processing (616) the next application message if the relationship between the contents of the application message (426) and the message contents label (422) is represented in the mapping (275). If the relationship between the contents of the application message (426) and the message contents label (422) is represented in the mapping (275), then the mapping (275) is already updated for use in calculating the collision indicator of the next application message received from the conversion application of the message transmitting device.

The method of FIG. 6 includes adding (614), by the messaging middleware of the message transmitting device, the relationship between the contents of the application message (426) and the message contents label (422) to the mapping (275) between contents of application messages and message contents labels if the relationship between the contents of the application message (426) and the message contents label (422) is not represented in the mapping (275). Adding (614), by the messaging middleware of the message transmitting device, the relationship between the contents of the application message (426) and the message contents label (422) to the mapping (275) according to the method of FIG. 6 may be carried out by associating the contents of the application message (426) with the message contents label (422) in the mapping (275) between contents of application messages and message contents labels. Adding (614) the relationship between the contents of the application message (426) and the message contents label (422) to the mapping (275) advantageously updates the mapping (275) for use in calculating the collision indicator of the next application message received from the conversion application of the message transmitting device.

The above description of filtering application messages in a high speed, low latency data communications environment according to embodiments of the present invention is described using a single message stream between the message receiving device and the message transmitting device for data communication. Readers will note, however, that implementing data communication between the message transmitting device and the message receiving device using a single message stream is for explanation only and not for limitation. In other embodiments of the present invention, multiple message streams may be used to transmit application messages from the message transmitting device to the message receiving device. In fact, using multiple message streams may reduce the total number of label collisions that exist in the system because label collisions typically occur only on a per stream basis. Label collisions typically occur only on a per stream basis because in multiple stream systems the message contents label may be composed of both a stream identifier and a hash value representing the message contents of an application message. Combining a stream identifier with a hash value representing the message contents eliminates label collisions from occurring between two application message on different streams because the stream identifier portion of the message contents label ensures the labels for the two message will always be different. In an embodiment of the present invention which implements multiple message streams, therefore, the total number of label collisions in the system may be reduced because label collisions that would have occurred from transmitting application messages on the same stream can be eliminated when the application messages are transmitted over separate message streams.

Exemplary embodiments of the present invention are described largely in the context of a fully functional computer system for filtering application messages in a high speed, low latency data communications environment. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of filtering application messages in a high speed, low latency data communications environment, the method comprising:

receiving an application message in a transport engine of a message receiving device from a message transmitting device, the application message having a message contents label and a collision indicator, the message contents label representing contents of the application message, the collision indicator specifying whether the message contents label represents different contents in at least one other application message;

determining, by the transport engine of the message receiving device, whether contents of the application message satisfy a transport layer constraint in dependence upon the message contents label;

providing, by the transport engine of the message receiving device, the application message and the collision indicator to messaging middleware of the message receiving device if the contents of the application message satisfy the transport layer constraint; and administering the application message, by the messaging middleware of the message receiving device, in dependence upon the collision indicator.

2. The method of claim 1 wherein administering the application message, by the messaging middleware of the message receiving device, in dependence upon the collision indicator further comprises:

determining whether a label collision for the application message exists in dependence upon the collision indicator; and providing the application message to an application of the message receiving device without filtering the application message in the messaging middleware of the message receiving device if a label collision for the application message does not exist.

3. The method of claim 1 wherein administering the application message, by the messaging middleware of the message receiving device, in dependence upon the collision indicator further comprises:

determining whether a label collision for the application message exists in dependence upon the collision indicator;

determining whether the contents of the application message satisfy a middleware layer constraint if a label collision for the application message exists; and administering the application message in dependence upon the determination whether the contents of the application message satisfy the middleware layer constraint.

4. The method of claim 1 further comprising:

receiving, in messaging middleware of the message transmitting device from a conversion application of the message transmitting device, the application message for transmission to the message receiving device;

retrieving, by the messaging middleware of the message transmitting device, the contents of the application message;

calculating, by the messaging middleware of the message transmitting device, the message contents label in dependence upon the retrieved contents of the application message;

setting, by the messaging middleware of the message transmitting device, the collision indicator for the application message in dependence upon the message content label and a mapping between contents of application messages and message contents labels; and transmitting, by a transport engine of the message transmitting device, the application message, the message contents label, and the collision indicator to the message receiving device.

5. The method of claim 4 further comprising:

determining, by the messaging middleware of the message transmitting device, whether a relationship between the contents of the application message and the message contents label is represented in the mapping between contents of application messages and message contents labels; and adding, by the messaging middleware of the message transmitting device, the relationship between the contents of the application message and the message contents label to the mapping between contents of application messages and message contents labels if the relationship between the contents of the application message and the message contents label is not represented in the mapping.

6. The method of claim 1 further comprising brokering, by a stream administration server, establishment of a message stream from the message transmitting device to the message receiving device, including authenticating the message receiving device, authorizing the message receiving device to receive application messages from the message transmitting device on the message stream, and providing to the transport engine of the message receiving device the transport layer constraint.

7. The method of claim 1 wherein the message receiving device is a subscribing client device and the message transmitting device is a feed adapter.

8. The method of claim 1 wherein the application message further comprises financial market data.

9. The method of claim 1 wherein the message contents label further comprises a message stream identifier.

10. A system for filtering application messages in a high speed, low latency data communications environment, the system comprising one or more computer processors, computer memory operatively coupled to the one or more computer processors, the computer memory having disposed within it computer program instructions capable of:

receiving an application message in a transport engine of a message receiving device from a message transmitting device, the application message having a message contents label and a collision indicator, the message contents label representing contents of the application message, the collision indicator specifying whether the message contents label represents different contents in at least one other application message;

determining, by the transport engine of the message receiving device, whether contents of the application message satisfy a transport layer constraint in dependence upon the message contents label;

providing, by the transport engine of the message receiving device, the application message and the collision indicator to messaging middleware of the message receiving device if the contents of the application message satisfy the transport layer constraint; and administering the application message, by the messaging middleware of the message receiving device, in dependence upon the collision indicator.

11. The system of claim 10 wherein administering the application message, by the messaging middleware of the message receiving device, in dependence upon the collision indicator further comprises:

determining whether a label collision for the application message exists in dependence upon the collision indicator; and providing the application message to an application of the message receiving device without filtering the application message in the messaging middleware of the message receiving device if a label collision for the application message does not exist.

12. The system of claim 10 wherein administering the application message, by the messaging middleware of the message receiving device, in dependence upon the collision indicator further comprises:
  determining whether a label collision for the application message exists in dependence upon the collision indicator;
  determining whether the contents of the application message satisfy a middleware layer constraint if a label collision for the application message exists; and
  administering the application message in dependence upon the determination whether the contents of the application message satisfy the middleware layer constraint.

13. The system of claim 10 further comprising computer program instructions capable of:
  receiving, in messaging middleware of the message transmitting device from a conversion application of the message transmitting device, the application message for transmission to the message receiving device;
  retrieving, by the messaging middleware of the message transmitting device, the contents of the application message;
  calculating, by the messaging middleware of the message transmitting device, the message contents label in dependence upon the retrieved contents of the application message;
  setting, by the messaging middleware of the message transmitting device, the collision indicator for the application message in dependence upon the message content label and a mapping between contents of application messages and message contents labels; and
  transmitting, by a transport engine of the message transmitting device, the application message, the message contents label, and the collision indicator to the message receiving device.

14. The system of claim 10 further comprising computer program instructions capable of brokering, by a stream administration server, establishment of a message stream from the message transmitting device to the message receiving device, including authenticating the message receiving device, authorizing the message receiving device to receive application messages from the message transmitting device on the message stream, and providing to the transport engine of the message receiving device the transport layer constraint.

15. A computer program product for filtering application messages in a high speed, low latency data communications environment, the computer program product comprising:
  a recordable computer readable storage medium having compute readable program code embodied therewith, the computer readable program code comprising:
  computer readable program code configured to:
  receive an application message in a transport engine of a message receiving device from a message transmitting device, the application message having a message contents label and a collision indicator, the message contents label representing contents of the application message, the collision indicator specifying whether the message contents label represents different contents in at least one other application message;
  determine, by the transport engine of the message receiving device, whether contents of the application message satisfy a transport layer constraint in dependence upon the message contents label;
  provide, by the transport engine of the message receiving device, the application message and the collision indicator to messaging middleware of the message receiving device if the contents of the application message satisfy the transport layer constraint; and
  administer the application message, by the messaging middleware of the message receiving device, in dependence upon the collision indicator.

16. The computer program product of claim 15 wherein the computer readable program code configured to administer the application message, by the messaging middleware of the message receiving device, in dependence upon the collision indicator further comprises computer readable program code configured to:
  determine whether a label collision for the application message exists in dependence upon the collision indicator; and
  provide the application message to an application of the message receiving device without filtering the application message in the messaging middleware of the message receiving device if a label collision for the application message does not exist.

17. The computer program product of claim 15 wherein the computer readable program code configured to administer the application message, by the messaging middleware of the message receiving device, in dependence upon the collision indicator further comprises computer readable program code configured to:
  determine whether a label collision for the application message exists in dependence upon the collision indicator;
  determine whether the contents of the application message satisfy a middleware layer constraint if a label collision for the application message exists; and
  administer the application message in dependence upon the determination whether the contents of the application message satisfy the middleware layer constraint.

18. The computer program product of claim 15 further comprising computer readable program code configured to:
  receive, in messaging middleware of the message transmitting device from a conversion application of the message transmitting device, the application message for transmission to the message receiving device;
  retrieve, by the messaging middleware of the message transmitting device, the contents of the application message;
  calculate, by the messaging middleware of the message transmitting device, the message contents label in dependence upon the retrieved contents of the application message;
  set, by the messaging middleware of the message transmitting device, the collision indicator for the application message in dependence upon the message content label and a mapping between contents of application messages and message contents labels; and
  transmit, by a transport engine of the message transmitting device, the application message, the message contents label, and the collision indicator to the message receiving device.

19. The computer program product of claim 18 further comprising computer readable program code configured to:
  determine, by the messaging middleware of the message transmitting device, whether a relationship between the contents of the application message and the message contents label is represented in the mapping between contents of application messages and message contents labels; and
  add, by the messaging middleware of the message transmitting device, the relationship between the contents of the application message and the message contents label to the mapping between contents of application messages and message contents labels if the relationship between the contents of the application message and the message contents label is not represented in the mapping.

20. The computer program product of claim 15 further comprising computer readable program code configured to broker, by a stream administration server, establishment of a message stream from the message transmitting device to the message receiving device, including authenticating the message receiving device, authorizing the message receiving device to receive application messages from the message transmitting device on the message stream, and providing to the transport engine of the message receiving device the transport layer constraint.

* * * * *